United States Patent
Jariwala et al.

(10) Patent No.: US 7,396,866 B2
(45) Date of Patent: Jul. 8, 2008

(54) FLUOROCHEMICAL DIESTERS AS REPELLENT POLYMER MELT ADDITIVES

(75) Inventors: Chetan P. Jariwala, Woodbury, MN (US); John A. Temperante, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 511 days.

(21) Appl. No.: 11/012,444

(22) Filed: Dec. 15, 2004

(65) Prior Publication Data

US 2006/0128850 A1    Jun. 15, 2006

(51) Int. Cl.
  *C08K 5/43*  (2006.01)
(52) U.S. Cl. ........................................ 524/168
(58) Field of Classification Search ................. 524/168
  See application file for complete search history.

(56) References Cited

U.S. PATENT DOCUMENTS

| | | | |
|---|---|---|---|
| 3,377,249 A | 4/1968 | Marco | |
| 3,728,151 A | 4/1973 | Sherman et al. | |
| 3,759,874 A | 9/1973 | Gresham | |
| 3,972,759 A | 8/1976 | Buntin | |
| 4,046,944 A | 9/1977 | Mueller et al. | |
| 5,025,052 A | 6/1991 | Crater et al. | |
| 5,099,026 A | 3/1992 | Crater et al. | |
| 5,178,931 A | 1/1993 | Perkins et al. | |
| 5,178,932 A | 1/1993 | Perkins et al. | |
| 5,459,188 A | 10/1995 | Sargent et al. | |
| 5,560,992 A | 10/1996 | Sargent et al. | |
| 5,898,046 A | 4/1999 | Raiford et al. | |
| 5,977,390 A | 11/1999 | Raiford et al. | |
| 6,063,474 A | 5/2000 | Raiford et al. | |
| 6,127,485 A * | 10/2000 | Klun et al. | 525/199 |
| 6,262,180 B1 | 7/2001 | Klun et al. | |
| 6,297,304 B1 | 10/2001 | Raiford et al. | |
| 6,586,522 B1 | 7/2003 | Jariwala et al. | |
| 6,858,290 B2 | 2/2005 | Mrozinski et al. | |
| 6,860,926 B2 | 3/2005 | Ishikawa et al. | |
| 2002/0060304 A1 | 5/2002 | Ishikawa et al. | |
| 2003/0228459 A1 | 12/2003 | Mrozinski et al. | |

FOREIGN PATENT DOCUMENTS

| | | |
|---|---|---|
| EP | 1 174 417 | 1/2002 |
| JP | 3-41160 | 2/1991 |
| JP | 2002-220781 | 8/2002 |
| WO | WO 93/05109 | 3/1993 |
| WO | WO 99/05345 | 2/1999 |
| WO | WO 01/64619 | 9/2001 |

OTHER PUBLICATIONS

Article by V. A. Wente, "Superfine Thermoplastic Fibers", Industrial and Engineering Chemistry, vol. 48(8), pp. 1342-1346 (1956).
Article by R.R. Buntin and D. T. Lohkamp, "Melt Blowing—A One-step Web Process for New Nonwoven Products", Journal of the Technical Association of the Pulp and Paper Industry, vol. 56(4), pp. 74-77 (1973).

* cited by examiner

*Primary Examiner*—Edward J Cain

(57) ABSTRACT

A thermoplastic polymer comprising a fluorochemical ester composition of formula I:

$$C_4F_9SO_2N(Q^1)(CH_2)_a\text{—}O\text{—}C(O)\text{—}(CH_2)_n\text{—}C(O)O(CH_2)_bNQ^2SO_2C_4F_9 \quad (I)$$

wherein $Q^1$ and $Q^2$ which may be the same or different are each a hydrogen or an alkyl group of 1 to 4 carbon atoms; a is an integer from 2 to 11; b is an integer from 2 to 11; and n is at least 10.

8 Claims, No Drawings

US 7,396,866 B2

FLUOROCHEMICAL DIESTERS AS REPELLENT POLYMER MELT ADDITIVES

FIELD

This invention relates to the addition of certain fluorochemical diesters to polymer melts to impart superior repellency of low surface tension fluids to thermoplastic polymers, in particular fibers, fabrics, nonwovens, films and molded articles.

BACKGROUND

Carpet and textile fibers are easily soiled and stained in everyday use. The problem of fiber soiling has become more difficult with the advent of synthetic fibers such as polypropylene, polyamide, polyethylene, and polyester, that are substantially more oleophilic (oil-loving) than traditional natural fibers such as cotton and wool.

A wide variety of materials are known to cause soiling. Soil found on fibers can include a variety of solid particles, such as fly ash or other inorganic particulates; liquids, such as oils and greases; mixtures of solids and liquids, such as soot (that contain particles mixed with oily components); and biological matter suchas skin cells and sebum.

Soil typically adheres to the fiber surface by Van der Waals forces, that are effective only over very short distances. The strength of the bond depends on the forces of interaction per unit interfacial area, the area of contact, and whether a liquid is present on the fiber surface. Oily films on the fiber increase soiling. In general, the higher the viscosity of the liquid, the greater the adhesion of the liquid to the fiber. Soil particles can even adhere to initially smooth surfaces, such as polyester and polyethylene film. Soil is not commonly mechanically entrapped in the fiber.

Staining of a fiber can occur in a wide variety of ways, including through the ionic or covalent binding of an exogenous colored substance to the fiber. For example, nylon fibers are polyamides with terminal amino and carboxyl end groups. Nylon is commonly stained by acid dyes, which are colored, negatively charged molecules that ionically bind to the protonated terminal amine. Examples of staining acid dyes include liquids containing FD&C Red Dye No. 4, wine, and mustard.

For many years, soil (as opposed to stain) resistance has been imparted to carpet and textile fibers by applying a finish that repels oil and water. Perhaps the first soil resist agent for fibers was starch, that was removed along with the soil when the fiber was washed. Other water soluble polymeric stain resist finishes have included methylcellulose, hydroxypropyl starch, polyvinyl alcohol, alginic acid, hydroxyethyl cellulose, and sodium carboxymethyl cellulose. As with starch, the strong disadvantage of these protective finishes is that their mechanism of action is sacrificial; they contain the soil but are removed along with it when the fiber is cleaned.

Vinyl polymers including acrylics, methacrylics and polymers of maleic acid have also been used as soil release agents. U.S. Pat. No. 3,377,249 discloses emulsions of copolymers of ethyl acrylate with at least 20% acrylic, methacrylic, or itaconic acid in combination with N-methylol acrylamide.

More recently, fluorochemical soil release agents have become very popular. The fluorochemical agents are coated onto the fiber to prevent wetting of the surface by minimizing chemical contact between the surface and substances that can soil the carpet, making the substance easier to remove.

The first fluorochemical finishes focused on reducing the surface energy of the fiber to prevent the spreading of oily soils. More recently developed fluorochemical finishes have attempted to combine reduction in surface energy with hydrophilicity, as described in U.S. Pat. No. 3,728,151. A number of patents describe fluorinated polymers for use as soil resist coatings for fibers, including U.S. Pat. No. 3,759,874 (describing polyurethanes that consist of a combination of an oleophilic fluorine-containing block and a hydrophilic polyethyleneoxide block) and U.S. Pat. No. 4,046,944 (describing a fluorinated condensation block copolymer, that include oleophilic fluorinated blocks and hydrophilic polyethyleneoxide blocks connected by urea linkages).

Although fluorinated finishing coats on fibers do impart an amount of soil resistance to the fiber, they all suffer from the distinct disadvantage that they are removed by routine maintenance of the fiber. None of the fluorochemical finishes available to date provides permanent protection from soiling and staining. This is a particular problem for polypropylene, that is very oleophilic, and that has begun to compete with nylon as a fiber for use in residential carpets.

Thermoplastic polymer fibers are frequently treated with fluorochemical compounds in order to affect the surface characteristics of the fiber, for example to improve water repellency or to impart stain or dry soil resistance. Most frequently, fluorochemical dispersions are applied topically to the fabrics made from these fibers by spraying, padding or foaming, followed by a drying step to remove water.

For example, a method is known for obtaining dry soil resistance and nonflame propagating characteristics in a textile fiber by applying topically aqueous dispersions of a variety of fluorinated esters derived from perfluoroalkyl aliphatic alcohols of the formula $C_nF_{2n+1}(CH_2)_mOH$ where n is from about 3 to 14 and m is 1 to 3, together with mono- or polycarboxylic acids which contain from 3 to 30 carbons and can contain other substituents. The fluorinated esters include, among others, a perfluoroalkylethyl stearate corresponding to "ZONYL" FTS available from DuPont, as well as perfluoroalkylethyl diesters made from dodecanedioic acid or tridecanedioic acid.

It is well recognized that the process of manufacturing thermoplastic polymeric fibers and fabrics could be simplified and significant capital investment could be eliminated if the topical application were replaced by incorporating a fluorochemical additive into the polymer melt prior to the extrusion of the fiber. The difficulty has been in finding suitably effective fluorochemical additives.

Thermoplastic polymers include, among others, polyolefins, polyesters, polyamides and polyacrylates. Polyolefins, and in particular polypropylene, are frequently used for disposable nonwoven protective garments, particularly in the medical/surgical field, in part because of a polyolefin's inherent water-repellency. However, polyolefins are not inherently good repellents for other lower surface tension fluids frequently encountered in the medical field such as blood and isopropyl alcohol. To get around this deficiency, fluorochemical dispersions are applied topically to these fabrics.

The requirements of an additive suitable for incorporating into a polyolefin melt include, besides the ability to repel low surface tension fluids at a low concentration of the additive, a satisfactory thermal stability and low volatility to withstand processing conditions. Preferably the compound will migrate to the surface of the fiber so as to minimize the amount of additive needed for adequate repellency. While this migration can often be enhanced by post-extrusion heating of the fiber, it is more preferable for the migration to occur without the need for this heating step. This requirement for mobility in the polymeric fiber in turn tends to limit the size of the fluorochemical molecule, and effectively eliminates from consideration high molecular weight polymeric fluorochemical additives.

The general concept of incorporating fluorochemical additives into a polyolefin fiber melt is known, but the difficulty in finding suitable effective additives has limited the application of this concept. Many of the past efforts to evaluate such fluorochemical additives have been aimed at improving other properties of the polyolefin, and do not teach methods of its improving repellency to low surface tension fluids.

Nonwoven composite structures are known consisting in part of two or more melt-extruded nonwoven layers, at least one of which includes an additive which imparts to the surface at least one characteristic different than the surface characteristics of the polymer alone as a result of preferential migration of the additive to the surface without the need for post-formation treatment of any kind. Examples of the additive-including layer include polypropylene modified by commercially available fluorochemical additives, including "ZONYL" FTS defined above.

U.S. Pat. Nos. 5,178,931 and 5,178,932 disclose specific nonwoven laminiferous and composite structures respectively, consisting in part of three melt-extruded nonwoven layers, the second of which includes an additive which imparts alcohol repellency as a result of preferential migration of the additive to the surface without the need for post-formation treatment of any kind, and where at least one of the first and third layers has been treated by topical application of an agent to change its characteristics in some way. Examples of the additive-including second layer include commercially available fluorochemicals, including "ZONYL" FTS.

Soil resistant polymeric compositions are known which are prepared by melt extrusion with a nonpolymeric fluorochemical dispersed throughout the polymer. The polymers used include polypropylene, polyethylene, polyamide and polyester, and the fluorochemical used is a perfluoroalkyl-stearate, in particular "ZONYL" FTS.

In addition, a polymeric composition is known comprising a mixture of a polymer selected from the group of polypropylene, polyethylene, polyamide and polyester with a fluorochemical comprising a fluorinated oleophobic, hydrophobic alkyl group attached to a nonfluorinated oleophilic alkyl, aryl, aralkyl or alkaryl moiety optionally through a linking moiety, which can be melt extruded as a mixture. A more specific description of the above fluorochemical is not disclosed, but among the many compounds which are applicable are esters where the oleophilic organic group contains from 2 to 35 carbon atoms. Examples of such are "ZONYL" FTS or a product made by transesterifying "ZONYL" BA with methyl stearate and methyl palmitate.

An automotive coating film is known containing an organic solvent-soluble waxy hydrocarbon which possesses a fluorine-containing organic group. This component is a product obtained by esterifying and coupling a high molecular weight alcohol with a carboxylic acid which possesses a fluorine-containing group or a product obtained by esterifying and coupling a high molecular weight fatty acid and an alcohol which possesses a fluorine-containing group. As examples of high molecular weight alcohols included are those with average carbon chain lengths with up to 50 carbons. As examples of high molecular weight fatty acids included are those with carbon chain lengths of up to 31 carbons (mellisic acid). The products were tested only as a waxing agent for automobiles.

Japanese Patent Application 3-41160 teaches a thermoplastic resin composition containing a perfluoroalkyl group-containing long chain fatty ester of the formula $R_f$—$R_1$—OCO—$R_2$ where $R_f$ is a perfluoroalkyl group with 5 to 16 carbons, $R_1$ is an alkylene group with 1 to 4 carbons, and $R_2$ is an unsaturated alkyl group or a saturated alkyl group with 21 to 50 carbons. One example reacts $C_8F_{17}C_2H_4OH$ with $C_{27}H_{55}COOH$ to produce the ester. The resins included polyethylene and polypropylene. Benefits of the additive were shown by the contact angle of water with molded articles of the resin. No tests are reported on the repellency to low surface tension fluids of the resulting polymers.

A need exists to achieve superior repellency to low surface tension fluids and superior product efficiency.

In summary, while the prior art discloses numerous examples of polyolefin fibers containing a fluorochemical additive incorporated at the melt stage to alter the surface characteristics of the extruded fiber, much of this was aimed at soiling and staining resistance, water repellency or other purposes.

U.S. Pat. Nos. 5,560,992 and 5,977,390 disclose soil resistant thermoplastic polymers containing a fluorochemical.

SUMMARY

The present invention comprises a composition and a process for imparting repellency of low surface tension fluids to thermoplastic polymer articles. The composition having repellency to low surface tension fluids of the present invention comprises a material prepared by:
(a) forming a mixture of (1) a thermoplastic polymer, and (2) a fluorochemical ester composition of formula I:

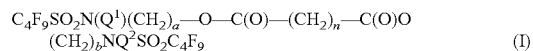

$$C_4F_9SO_2N(Q^1)(CH_2)_a\text{—}O\text{—}C(O)\text{—}(CH_2)_n\text{—}C(O)O\\(CH_2)_bNQ^2SO_2C_4F_9 \qquad (I)$$

wherein
$Q^1$ and $Q^2$ which may be the same or different are each a hydrogen or an alkyl group of 1 to 4 carbon atoms; a is an integer from 2 to 11; b is an integer from 2 to 11; and n is at least 10; and
(b) melt extruding the mixture.

Compositions of the invention yield polymeric articles that exhibit a surprisingly good combination of oil repellency and water repellency.

The present invention further comprises the above composition in the form of a filament, fiber, nonwoven fabric or web, film or molded article.

The present invention further comprises a process for imparting repellency of low surface tension fluids to a thermoplastic polymer article comprising forming a mixture prior to article formation of a polymer and an effective amount of a fluorochemical compound comprising a fluorocarbon ester as defined above and melt extruding the mixture. Such articles include filaments, fibers, nonwoven webs or fabrics, films or molded articles.

DETAILED DESCRIPTION OF ILLUSTRATIVE EMBODIMENTS

Superior repellency to low surface tension fluids is imparted to thermoplastic polymer articles, in particular fibers, fabrics, filaments, nonwovens, films, and molded articles, by the addition of certain monomeric fluorinated ester compounds to a polymer prior to article formation and melt extruding the resulting mixture. This process is used either with or without post-extrusion heating of the article to promote movement of the additive to the article surface, since the ester compounds of this invention tend by their nature to concentrate on the surface.

The term "low surface tension fluids" is used herein to mean fluids having a surface tension of less than 50 dynes/cm ($50 \times 10^{-7}$ newton meter). Examples of such fluids include alcohols, blood, and certain body fluids.

The composition of the present invention comprises a material prepared by melt extruding a mixture of a thermoplastic polymer a mixture of (1) a thermoplastic polymer, and (2) a fluorochemical ester composition of formulae I:

$$C_4F_9SO_2N(Q^1)(CH_2)_a-O-C(O)-(CH_2)_n-C(O)O(CH_2)_b NQ^2SO_2C_4F_9 \quad (I)$$

wherein $Q^1$ and $Q^2$ which may be the same or different are each a hydrogen or an alkyl group of 1 to 4 carbon atoms; a is an integer from 2 to 11; b is an integer from 2 to 11; and n is at least 10.

Preferably a is 2 as the resultant compositions containing such additives tend to exhibit better oil repellency.

Preferably b is 2 as the resultant compositions containing such additives tend to exhibit better oil repellency.

Preferably n is from 16 to 20, most preferably 16, as the resultant compositions containing such additives tend to exhibit optimum oil repellency and water repellency.

Compositions of the invention typically comprise about 0.1 to about 5.0 weight percent of the fluorochemical ester. Compositions of the invention typically have a fluorine content of from about 200 to about 10,000 parts per million (by weight).

The term fluorochemical, as used herein, refers to an organic nonpolymeric compound in which more than two of the hydrogens atoms attached directly to carbon have been replaced with fluorine, or an organic polymeric compound in which at least one hydrogen attached to a carbon in a monomer used to prepare the polymer or copolymer is replaced with fluorine. Fluorochemicals are sometimes also called fluorocarbons or fluorocarbon polymers. Fluorochemicals can include other halogen atoms bound to carbon, notably chlorine.

The presence of the fluorine atoms impart stability, inertness, nonflammability, hydrophobic, and oleophobic characteristics to the molecule. Fluorochemicals are typically more dense and more volatile than the corresponding hydrocarbons and have lower refractive indices, lower dielectric constants, lower solubilities, and lower surface tensions than the corresponding nonfluorinated compound or polymer.

The fluorochemical selected for extrusion with the polymer can be perfluorinated, wherein all of the hydrogens are replaced with fluorine atoms, or semifluorinated, wherein two or more, but not all, of the hydrogens are replaced with fluorine. Suitable fluorochemicals for use in preparation of the soil resistant fibers are small molecules, oligomers, or polymers, or mixtures of these. The fluorochemical can be added to the mechanical blender in a solid or liquid form.

The fluorochemical or mixture of fluorochemicals that is selected should not include any moiety that reacts adversely or degrades on extrusion. Nonlimiting examples of functional or functionalized moieties that can be included in the fluorochemical include alcohols, glycols, ketones, aldehydes, ethers, esters, amides, acids, acrylates, urethanes, ureas, alkanes, alkenes, alkynes, aromatics, heteroaromatics, and nitriles. The functionalized moieties in the fluorochemical must be compatible with, and not adversely react with, functional or functionalized moieties in the polymer fiber, and must not decompose into undesired products during extrusion.

The fluorochemical extruded with the polymer can be homogeneous or can include a mixture of semifluorinated compounds, perfluorinated compounds, or both semifluorinated and perfluorinated compounds.

A wide range of fluorocarbon hydrocarbon polymers are known, including polytetrafluoroethylene, polymers of chlorotrifluoroethylene, fluorinated ethylene-propylene polymers, polyvinylidene fluoride, and poly(hexafluoropropylene). A variety of fluorochemicals are available Commercially, many from E. I. Du Pont Nemours and Company, Wilmington, Del. Other fluorochemicals that can be used include those that are now used commercially in fluorochemicals coatings, including Scotchgard™ 358 and 352 (3M Co.), Zonyl™ 5180 Fluorochemical dispersion, and Teflon™ Toughcoat Anionic (E. I. Du Pont de Nemours and Company, Inc.). Zonyl™ 5180 is an aqueous fluorochemical dispersion containing a 1-10% polyfunctional perfluoroalkyl ester mixture, 10-20% polymethylmethacrylate, and 70-75% water. Teflon™ Toughcoat Anionic contains 5-10% perfluoroalkyl substituted urethanes, 1-5% polyfunctional perfluoroalkyl esters, and 85-90% water.

If the fluorochemical is obtained as a water based emulsion, the emulsifiers and water should be removed before the fluorochemical is added to the blender with the polymer.

In a preferred embodiment, a fluorochemical is used that has a fluorinated alkyl group attached to a nonfluorinated oleophilic, alkyl, aryl, alkaryl or aralkyl group through a linking moiety. The fluorinated alkyl group tends to migrate through the fiber to the surface because it is both oleophobic and hydrophobic. The nonfluorinated oleophilic group remains anchored in the fiber. A fluorochemical containing a combination of a fluorinated alkyl group attached to a nonfluorinated organic group, thus, provides surface soil resistance and yet is held in the fiber. The linking moiety can be any chemical group that does not significantly adversely affect the desired performance of the fluorochemical, nor chemically react with the fiber.

Nonlimiting examples of fluoroaliphatic group-containing compounds useful for the preparation of soil resistant fibers are illustrated in Formula I.

Unexpectedly, we have found that thermoplastic compositions of the invention can be made which exhibit superior oil repellency and water repellency but which are substantially free of compounds having the formula:

$$R_f^3SO_2N(Q^1)(CH_2)_a-O-C(O)-(CH_2)_n-C(O)-O-(CH_2)_b NQ^2SO_2R$$

wherein $R_f^3$ is $F(CF_2)_x$— with x being from 4 to 20 or the formula:

$$RSO_2N(Q^1)(CH_2)_a-O-C(O)-(CH_2)_n-C(O)-O-(CH_2)_b NQ^2SO_2R$$

wherein R is a saturated aliphatic hydrocarbon having from about 12 to about 66 carbon atoms.

Polymeric compositions that are permanently soil resistant are prepared that have fluorochemical dispersed throughout the polymer. Carpet and textile fibers prepared in this way have reduced surface energy and low static properties relative to the fiber without the fluorochemical. The fibers represent a significant advance in fiber and textile technology, in that the fluorochemical is dispersed throughout the polymer instead of coated onto the fiber, and is not removed from the fiber on washing.

The dispersion of the fluorochemical in the polymer improves characteristics of the polymer other than soil resistance. For example, polypropylene fibers that are extruded without a fluorochemical are highly static. Antistatic agents must be applied to the fiber after extrusion to keep the fiber from breaking or static clinging during later processing steps.

However, the antistatic agents must be removed from the fiber by scouring after the fiber is tufted because they can increase the tendency of the fiber to soil on use. This process is cumbersome and increases the cost of the fiber. Polymers, and in particular polypropylene fibers, extruded with a fluorochemical do not require antistatic agents to facilitate handling, because they have inherently low static energy.

Fluorochemicals also impart antiwetting characteristics to polymers that are useful for a number of applications. For example, the fluorochemical can be extruded with a polymer into a thin film that repels water. This is particularly useful for certain manufacturing procedures that require a dry film for the application, for example, addition of an adhesive to a recently extruded film. Dispersion of the fluorochemical into the polymer also decreases the flammability and alters the combustion characteristics of the polymer.

Thermoplastic Polymer

The term "copolymer" as used herein includes polymers formed by the polymerization of at least two different monomers; a monomer and a polymer; or two or more polymers or oligomers. For simplicity, the term polymer as used herein includes copolymers and mixtures of polymers.

Any polymer, copolymer, or mixture of polymers is suitable for use in the soil resistant fiber that can be melt extruded and that is compatible with the desired fluorochemical. Common polymers that are typically melt extruded include nylon 6, polyester, polypropylene, polyethylene, and polyurethane.

A polymer should be selected that, when combined with the fluorochemical, has an appropriate viscosity and shear rate on extrusion. It should solidify within a reasonable time to a filament with appropriate characteristics for the desired function, including tensile strength (strain), elongation (stress), modulus, crystallinity, glass transition temperature, and melt temperature. These characteristics can be measured by known methods.

PCT/US92/05906 discloses a method for the preparation of polyurethane compositions with low surface energy that includes polymerizing a mixture comprising polyisocyanate, polyol, and a non-reactive fluoroaliphatic moiety of the types disclosed herein. The polyurethane is not prepared by simple extrusion of the fluorochemical with a preformed polyurethane, but instead by reactive extrusion, in which the monomers are actually polymerized in the presence of the fluorochemical. In contrast, in this invention, preformed polymers are simply melt extruded with the fluorochemical to form a soil resistant material.

Extrusion

There are various methods by which the above compounds can be prepared, and the inventive process is not limited to a particular method of preparation. For example, the above compounds are conveniently made by reacting an appropriate fatty alcohol with the appropriate fluorocarbon acid to form an acid ester, or by reacting an appropriate fatty acid with the appropriate fluorocarbon alcohol. Other compounds in these groups are readily made by those skilled in the art by following similar processes.

The esters useful in this invention are mixed with thermoplastic polymers by adding them to pelletized, granular, powdered or other appropriate forms of the polymers and rolling, agitating or compounding the mixture to achieve a uniform mixture which is then melt extruded. Alternatively the esters are added to a polymer melt to form a mixture which is then melt extruded. The thermoplastic polymer is a polyolefin, polyester, polyamide, or polyacrylate. The thermoplastic polymer preferably is a polyolefin, mixture or blend of one or more polyolefins, a polyolefin copolymer, mixture of polyolefin copolymers, or a mixture of at least one polyolefin and at least one polyolefin copolymer. The thermoplastic polymer is more preferably a polyolefin polymer or copolymer wherein the polymer unit or copolymer unit is ethylene, propylene or butylene or mixtures thereof. Thus the polyolefin is preferably polypropylene, polyethylene, polybutylene or a blend or copolymer thereof.

The amount of the fluorinated compound to be added to the thermoplastic polymer is preferably between 0.1 and about 5% by weight of the polymer. Amounts above this range can be used but are unnecessarily expensive in relation to the benefit received. The blend is then melted and extruded into fibers, filaments, nonwoven webs or fabrics, films, or molded articles using known methods.

Extrusion is used to form various types of nonwovens. In particular, extrusion is used to form a melt blown nonwoven web of continuous and randomly deposited microfibers having an average diameter of approximately 0.1 to 15 or more microns, preferably in the range of about 3 to 5 microns. The melt extrusion is carried out through a die at a resin flow rate of at least 0.1 to 5 grams per minute per hole, with the microfibers being randomly deposited on a moving support to form the web.

In the above melt blowing process, polymer and a compound of the present invention are fed into an extruder where it is melted and passed through a die containing a row of tiny orifices. As the polymer emerges from the die, it is contacted by two converging, high-velocity hot air streams, which attenuate the polymer into a blast of fine, discontinuous fibers of 0.1 to 10 microns in diameter. The useful polymer throughputs or flow rates range from 0.1 to 5 grams per minute per hole. Typical gas flow rates range from 2.5 to 100 pounds per square inch ($1.72 \times 10^5$ to $6.89 \times 10^5$ Pa) per minute of gas outlet area. The air temperature ranges from about 400° F. (204° C.) to 750° F. (399° C.). Cooling air then quenches the fibers, and they are deposited as a random, entangled web on a moving screen which is placed 6 to 12 inches (15.2 to 30.5 cm) in front of the blast of fibers.

Melt blowing processes are described in further detail in articles by V. A. Wente, "Superfine Thermoplastic Fibers", Industrial and Engineering Chemistry, Vol. 48(8), pp 1342-1346 (1956); and by R. R. Buntin and D. T. Lohkamp, "Melt Blowing—A One-step Web Process for New Nonwoven Products", Journal of the Technical Association of the Pulp and Paper Industry, Vol. 56(4), pp 74-77 (1973); as well as in U.S. Pat. No. 3,972,759. The disclosures of these documents are hereby incorporated by reference.

The unique properties of a melt blown nonwoven web comprised of a random array of fine, entangled fibers include very large surface areas, very small pore sizes, moderate strength and light weight fabric structure. These properties make the nonwoven webs particularly suitable for such applications as medical fabrics where barrier properties as well as breathability and drape are important.

Extrusion is also used to form polymeric films. In film applications, a film forming polymer is simultaneously melted and mixed as it is conveyed through the extruder by a rotating screw or screws and then is forced out through a slot or flat die, for example, where the film is quenched by a variety of techniques known to those skilled in the art. The films optionally are oriented prior to quenching by drawing or stretching the film at elevated temperatures.

Molded articles are produced by pressing or by injecting molten polymer from a melt extruder as described above into a mold where the polymer solidifies. Typical melt forming techniques include injection molding, blow molding, compression molding and extrusion, and are well known to those skilled in the art. The molded article is then ejected from the mold and optionally heat-treated to effect migration of the polymer additives to the surface of the article.

An optional heating or annealing step can be conducted but is not required. The polymer melt or extruded fiber, filament, nonwoven web or fabric, film, or molded article is heated to a temperature of from about 25° C. to about 150° C. The heating in some cases may improve the effectiveness of the fluorochemical additive in imparting alcohol repellency.

The compositions of the present invention are useful in various fibers, filaments, nonwoven webs or fabrics, films and molded articles. Examples include fibers for use in fabrics and carpets, nonwoven fabrics used in protective garments used in the medical/surgical field, and molded plastic articles of many types. The process of the present invention is useful for imparting repellency of low surface tension fluids to various thermoplastic polymer articles such as filaments, fibers, nonwoven webs or fabrics, films and molded articles.

Soil resistant fibers can also be prepared by thin core coextrusion, that involves the extrusion of an inner core of a polymer with an outer core of a polymer that has fluorochemical embedded in it. Machinery appropriate for thin-core coextrusion is available from Hills Research corporation in Florida. For durability, an inner polymer core should be chosen that adheres sufficiently to the outer soil resistant polymeric composition. Thin core coextrusion can be used to prepare a wide variety of fibers for varying applications at varying costs. For example, a less expensive polymer can be used as an inner core of the fiber, and the desired polymer with fluorochemical soil protection as the outer core. Alternatively, a soil resistant fiber can be strengthened with a strong inner polymer core. Nonlimiting examples include fibers prepared by coextruding a polypropylene inner core with a polyamide/fluorochemical outer core, a polyamide inner core with a polypropylene/fluorochemical outer core, a polyethylene inner core with a polypropylene/fluorochemical outer core, a polypropylene inner core with a polyethylene/fluorochemical outer core, a polyethylene inner core with a polyamide/fluorochemical outer core, a polyamide inner core with a polyethylene/fluorochemical outer core, a polyester inner core with a polyamide/fluorochemical outer core, a polyamide inner core with a polyester/fluorochemical outer core, a polyethylene inner core and a polyester/fluorochemical outer core, a polypropylene inner core and a polyester/fluorochemical outer core, a polyester inner core and a polyethylene/fluorochemical outer core, a polyester inner core and a polypropylene/fluorochemical outer core, and variations of these.

The temperature of extrusion will vary depending on the polymer and fluorochemical used in the process. Typical extrusion temperatures vary from 100° F. to 800° F., however, extrusion temperatures outside this range may be required in certain processes. The fiber denier will also vary depending on the product being prepared, and are typically within the range of 1 to 50,000. Carpet fibers typically range from 900 denier to 8000 denier.

A wide variety of textile treatment chemicals can be added to the extrusion process to improve the properties of the product. Examples include antioxidants, flame retardants, ultra-violet absorbers, dyes or coloring agents, and microbiocidal agents, including antibacterial agents, antifungals, and antialgals. Any commercially available textile treatment chemical that does not degrade or adversely react in the extrusion process is appropriate. Commercially available flame retardants include alumina trihydrate, calcium carbonate, magnesium carbonate, barium carbonate, metal oxides, borates, sulfonates, and phosphates.

EXAMPLES

The invention will be further explained with the following illustrative examples.

The following test methods and preparation methods were used.

Water Repellency Test

Nonwoven web samples were evaluated for water repellency using 3M Water Repellency Test V for Floorcoverings (February 1994), available from 3M Company. In this test, samples are challenged to penetrations by blends of deionized water and isopropyl alcohol (IPA). Each blend is assigned a rating number as shown below:

| Water Repellency Rating Number | Blend (% by volume) |
| --- | --- |
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a nonwoven web sample is placed on a flat, horizontal surface. Five small drops of water or a water/IPA mixture are gently placed at points at least two inches apart on the sample. If, after observing for ten seconds at a 45° angle, four of the five drops are visible as a sphere or a hemisphere, the nonwoven web sample is deemed to pass the test. The reported water repellency rating corresponds to the highest numbered water or water/IPA mixture for which the nonwoven sample passes the described test. It is desirable to have a water repellency rating of at least 4, preferably at least 6.

Oil Repellency Test

Nonwoven web samples were evaluated for oil repellency using 3M Oil Repellency Test III (February 1994), available from 3M Company, St. Paul, Minn. In this test, samples are challenged to penetration by oil or oil mixtures of varying surface tensions. Oils and oil mixtures are given a rating corresponding to the following:

| Oil Repellency Rating Number | Oil Composition |
| --- | --- |
| 0 | (fails Kaydol ™ mineral oil) |
| 1 | Kaydol ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the nonwoven web sample passes the test. It is desirable to have an oil repellency rating of at least 1, preferably at least 3.

Melt Blown Extrusion Procedure

The extruder used was a Brabender CTSE-V counter-rotating conical twin screw extruder, with maximum extrusion temperature of approximately 220° C. and with the distance to the collector of approximately 11 inches.

The fluorochemical and thermoplastic polymer were each weighed and mixed in a paperboard container. Using a mixer head affixed to a basic hand drill they were then mixed for about one minute until a visually homogeneous mixture was obtained. This mixture was then added to the extruder hopper.

The process conditions for each mixture were the same, including the melt blowing die construction used to blow the microfiber web, the basis weight of the web (50±5 g/M2) and the diameter of the microfibers (10 to 15 micrometers). The extrusion temperature was approximately 220° C., the primary air temperature was 220° C., the pressure was 7 psi (48 kPa), with a 0.030 inch (0.76 cm) air gap width and the polymer throughput rate was about 10 lbs/hr.

GLOSSARY

Adipic acid is a C6 aliphatic dicarboxylic acid, available from Aldrich.
Azelaic acid is a C9 aliphatic dicarboxylic acid, available from Aldrich.
Dodecanedioic acid is a C12 aliphatic dicarboxylic acid, available from DuPont.
Octadecanedioic acid is a C18 aliphatic dicarboxylic acid, available from Cognis Corporation as EMEROX™ 118.
Eicosanedioic acid is a C20 aliphatic dicarboxylic acid, available from TCI, Portland, Oreg.
Docosanedioic acid is a C22 aliphatic dicarboxylic acid, available from Aldrich.
MEFFBSE—$C_4F_9SO_2N(CH_3)C_2H_4OH$, a fluorochemical alcohol having an equivalent weight of 357, can be made in two stages by reacting perfluorobutanesulfonyl (PBSF) with methylamine and ethylenechlorohydrin, using a procedure essentially as described in Example 1 of U.S. Pat. No. 2,803,656 (Ahlbrecht, et al.).
UNILIN™ 350, was from Baker-Petrolite, Tulsa, Okla.
ESCORENE™ PP3505G polypropylene is polypropylene having a 400 melt flow rate available from Exxon Chemical Company, Baytown, Tex.
HUNTSMAN™ PS440-200 polyurethane having a 400 melt flow rate.

Synthesis of Fluorochemical Diesters

Fluorochemical diester F-4 was prepared by esterifying MEFFBSE alcohol with octadecanedioic acid at a molar ratio of 2:1 using the following procedure.

To a 3 necked round bottom flask was added 25 g (0.0793 moles) of Emerox 118 (available from Cognis Corporation, Cincinnati, Ohio), 56.7 g (0.159 moles) of MEFBSE, 100 g toluene and 1 g (0.007 moles) of 70 wt % solution of methanesulfonic acid. The contents of the flask were refluxed using a Dean-Stark trap and a condenser at 112° C. for 12 hrs. The solution was then cooled to 80° C. To this solution was added 1.08 g (0.007 moles) of triethanol amine and the solution was stirred at 80° C. for 1 hr. This toluene solution was then washed with 75 g hot water (80° C.) three times. After the last wash the organic bottom layer was distilled to remove the toluene. The residue remaining the flask was the diester product, which was poured into a jar and allowed to crystallize on cooling to room temperature.

Fluorochemical diesters F-1 through F-3 and F-5 through F-6 were prepared using essentially the same procedure as was used for Fluorochemical diester F-4, except that the aliphatic dicarboxylic acid was varied. Table 1 shows the various alcohols and dicarboxylic acids used to prepare the fluorochemical diesters.

For comparison, fluorochemicals F-7 through F-10 were also prepared.

Fluorochemical diester F-7 was prepared using essentially the same procedure as was used for fluorochemical diester F-4 except $C_8F_{17}C_2H_4OH$ was used instead of MEFBSE alcohol and the aliphatic Diacid was dodecanedioic acid. Fluorochemical diester F-8 was prepared in the same manner except using octadecanedioic acid instead of dodecanedioic acid.

Fluorochemical diester F-9 was prepared by esterifying UNILIN 350, a C4 alcohol, with dodecanedioic acid at a molar ratio of 1:1:1 using the same procedure. Fluorochemical diester F-10 was prepared in the same manner except using octadecanedioic acid instead of dodecanedioic acid.

TABLE 1

| Fluorochemical Diester | Alcohol | Dicarboxylic acid type |
| --- | --- | --- |
| F-1 | MEFEBSE | Adipic acid (n = 4) |
| F-2 | MEFEBSE | Azelaic acid (n = 7) |
| F-3 | MEFEBSE | Dodecanedioic acid (n = 10) |
| F-4 | MEFEBSE | Octadecanedioic acid (n = 16) |
| F-5 | MEFEBSE | Eicosanedioic acid (n = 18) |
| F-6 | MEFEBSE | Docosanedioic acid (n = 20) |
| F-7 | $C_8F_{17}C_2H_4OH$ | Dodecanedioic acid (n = 10) |
| F-8 | $C_8F_{17}C_2H_4OH$ | Octadecanedioic acid (n = 16) |
| F-9 | MEFEBSE UNILIN 350 | Dodecanedioic acid (n = 10) |
| F-10 | MEFEBSE UNILIN 350 | Octadecanedioic acid (n = 16) |

EXAMPLES

The fluorochemical diesters from Table 1 were mixed with ESCORENE™ PP3505G polypropylene at a level of 1.0 weight percent based on the weight of the polypropylene, and the mixtures were thermally extruded into nonwoven webs using the Melt Blown Extrusion Procedure described above. The nonwoven webs were evaluated for repellency using the Water Repellency Test and the Oil Repellency Test described above. The samples were tested 1) immediately after collection of the fiber to form a web, 2) after sitting for 24 hours at room temperature, and 3) after annealing at 80° C., 100° C. and 120° C. for 2 minutes followed by sitting at room temperature for 24 hours. The water and oil repellency data are provided in Table 2.

In Comparative Example 7 and Example 5, HUNTSMAN™ PS440-200 polyurethane was used instead of ESCORENE™ PP3505 polypropylene and a nonwoven web melt blown using 1.0 weight percent of the indicated fluorochemical diesters.

TABLE 2

| Example | Fluorochemical Diester | Water Repellency Initial | Water Repellency 24 hrs | 80° C. | 100° C. | 120° C. | Oil Repellency Initial | Oil Repellency 24 hrs | 80° C. | 100° C. | 120° C. |
|---|---|---|---|---|---|---|---|---|---|---|---|
| C1 | F-1 | 5 | 5 | 4 | 3 | 3 | 4 | 3 | 3 | 0 | 2 |
| C2 | F-2 | 5 | 5 | 4 | 4 | 5 | 1 | 1 | 0 | 1 | 2 |
| 1 | F-3 | 8 | 8 | 7 | 7 | 6 | 1 | 2 | 2 | 1 | 1 |
| 2 | F-4 | 7 | 7 | 10 | 9 | 7 | 2 | 2 | 6 | 6 | 1 |
| 3 | F-5 | 6 | 5 | 10 | 9 | 9 | 2 | 2 | 6 | 6 | 1 |
| 4 | F-6 | 4 | 4 | 10 | 7 | 8 | 1 | 1 | 6 | 5 | 1 |
| C3 | F-7 | 3 | 3 | 3 | 3 | 2 | 0 | 0 | 0 | 0 | 0 |
| C4 | F-8 | 6 | 6 | 5 | 3 | 3 | 0 | 1 | 0 | 0 | 0 |
| C5 | F-9 | 3 | 5 | 3 | 3 | 2 | 0 | 1 | 0 | 1 | 0 |
| C6 | F-10 | 8 | 8 | 5 | 3 | 3 | 0 | 0 | 0 | 0 | 0 |
| 5 | F-4 | 5 | 5 | 5 | 5 | 5 | 6 | 6 | 4 | 6 | 5 |
| C7 | None | 2 | 2 | 2 | 2 | 2 | 0 | 0 | 0 | 0 | 0 |

As these results show, compositions of the invention (illustrated in Examples 1-4) provide superior performance as compared to compositions disclosed in U.S. Pat. No. 5,560,992 (illustrated in Comparative Examples C1, C2, C3, and C4) and in U.S. Pat. No. 5,977,390 (illustrated in Comparative Examples C5 and C6).

What is claimed is:

1. A composition comprising a material prepared by:
   (a) forming a mixture of (1) a thermoplastic polymer, and (2) a fluorochemical ester composition of the formula I:

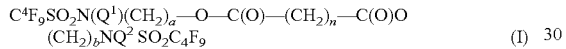

(I)

wherein
   $Q^1$ and $Q^2$ which may be the same or different are each a hydrogen or an alkyl group of 1 to 4 carbon atoms; a is an integer from 2 to 11; b is an integer from 2 to 11; and n is from 10 to 20; and
   (b) melt extruding the mixture.

2. The composition of claim 1 wherein said thermoplastic polymer is selected from the group consisting of polyolefin, polyamide, polyester, polyacrylate, polyurethane, and blends and copolymers thereof.

3. The composition of claim 1 wherein a is 2 and b is 2.

4. The composition of claim 1 wherein $Q^1$ and $Q^2$ are each $CH_3$.

5. The composition of claim 1 wherein the fluorochemical is present in an amount of from about 0.1% to about 5% by weight of the polymer.

6. The composition of claim 1 having a fluorine content of from about 200 to about 10,000 parts per million.

7. The composition of claim 1 wherein said composition is substantially free of compounds having the formula

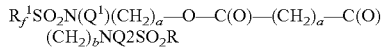

wherein $R_f^1$ is $F(CF_2)_x$— with x being from 4 to 20 or the formula

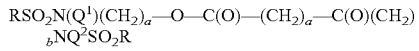

wherein R is a saturated aliphatic hydrocarbon having from about 12 to about 66 carbon atoms.

8. The composition of claim 1 wherein n is from 16 to 20.

* * * * *

UNITED STATES PATENT AND TRADEMARK OFFICE
CERTIFICATE OF CORRECTION

PATENT NO. : 7,396,866 B2
APPLICATION NO. : 11/012444
DATED : July 8, 2008
INVENTOR(S) : Chetan P. Jariwala It is certified that error appears in the above-identified patent and that said Letters Patent is hereby corrected as shown below:

Column 1
Line 25, delete "suchas" and insert -- such as --, therefor.

Column 3
Line 62, delete "(mellisic" and insert -- (melissic --, therefor.

Column 5
Line 30, delete "hydrogens" and insert -- hydrogen --, therefor.

Column 6
Line 8, delete "Commercially," and insert -- commercially, --, therefor.

Column 10
Line 67, delete "prefarably" and insert -- preferably --, therefor.

Column 11
Line 41, delete "polyropylene" and insert -- polypropylene --, therefor.

Column 12
Line 50, delete "polyropylene" and insert -- polypropylene --, therefor.

Column 13
Line 30, in Claim 1, delete "$C^4$" and insert -- $C_4$ --, therefor.

UNITED STATES PATENT AND TRADEMARK OFFICE
CERTIFICATE OF CORRECTION

PATENT NO. : 7,396,866 B2
APPLICATION NO. : 11/012444
DATED : July 8, 2008
INVENTOR(S) : Chetan P. Jariwala It is certified that error appears in the above-identified patent and that said Letters Patent is hereby corrected as shown below:

<u>Column 14</u>
Line 30, in Claim 7, delete "$(CH_2)_a$" and insert -- $(CH_2)_n$ --, therefor.
Line 30, in Claim 7, delete "NQ2" and insert -- $NQ^2$ --, therefor.
Line 34, in Claim 7, delete "$(CH_2)_a$" and insert -- $(CH_2)_n$ --, therefor.

Signed and Sealed this

Second Day of December, 2008

JON W. DUDAS
*Director of the United States Patent and Trademark Office*